United States Patent [19]

Tamashima et al.

[11] Patent Number: 5,039,525

[45] Date of Patent: Aug. 13, 1991

[54] POLYPROPYLENE RESIN COMPOSITION

[75] Inventors: Norihisa Tamashima, Okazaki; Kouhei Ueno, Sakai; Tomohiko Akagawa, Sakai; Saburo Hinenoya, Sakai; Shinji Katsui, Sakai, all of Japan

[73] Assignee: Toyota Jidosha Kabushiki Kaisha & Ube Industries, Ltd., Japan

[21] Appl. No.: 620,459

[22] Filed: Nov. 30, 1990

Related U.S. Application Data

[63] Continuation of Ser. No. 286,137, Dec. 19, 1988, abandoned.

[30] Foreign Application Priority Data

Dec. 22, 1987 [JP] Japan ................... 62-324396

[51] Int. Cl.$^5$ ................................ C08K 7/04
[52] U.S. Cl. ..................... 524/423; 524/451
[58] Field of Search ................. 524/423, 451

[56] References Cited

U.S. PATENT DOCUMENTS

| | | | |
|---|---|---|---|
| 4,363,885 | 12/1982 | Fukui et al. | 523/212 |
| 4,412,016 | 10/1983 | Fukui et al. | 523/206 |
| 4,467,061 | 8/1984 | Yamamoto et al. | 524/87 |

FOREIGN PATENT DOCUMENTS

| | | |
|---|---|---|
| 53-64257 | 6/1978 | Japan . |
| 57-109846 | 7/1982 | Japan . |
| 57-195134 | 11/1982 | Japan . |
| 59-172540 | 9/1984 | Japan . |
| 59-49252 | 12/1984 | Japan . |
| 60-3420 | 1/1985 | Japan . |
| 60-31868 | 7/1985 | Japan . |
| 61-69848 | 4/1986 | Japan . |
| 62-91545 | 4/1987 | Japan . |

*Primary Examiner*—Paul R. Michl
*Assistant Examiner*—Edward J. Cain
*Attorney, Agent, or Firm*—Parkhurst, Wendel & Rossi

[57] ABSTRACT

A polypropylene resin composition obtained by mixing a crystalline ethylene-propylene block copolymer, an amorphous ethylene-propylene copolymer, talc and fibrous magnesium oxysulfate and then, at the time of melt-kneading the mixture, adding a metal soap to the mixture, retains the fiber length of the fibrous magnesium oxysulfate and has high rigidity with the addition of a small amount of the metal soap.

3 Claims, No Drawings

POLYPROPYLENE RESIN COMPOSITION

This is a continuation of application Ser. No. 07/286,137 filed Dec. 19, 1988, now abandoned.

BACKGROUND OF THE INVENTION

The present invention relates to a polypropylene resin composition and, more particularly, to a polypropylene resin composition which is composed mainly of a crystalline ethylene-propylene copolymer, which is well balanced particularly in rigidity and impact resistance, has good mar resistance and excellent moldability and can provide a molded article of excellent appearance. The polypropylene resin composition can be utilized in the field of large-sized parts for automobiles.

Crystalline polypropylene is in use in various molded articles in which physical properties such as rigidity, resistance to heat deformation and the like are required. However, having insufficient low temperature properties and being a non-polar highly-crystalline polymer, crystalline polypropylene has poor impact resistance and cannot be used in applications in which rigidity, resistance to heat deformation and impact resistance are required together.

In order to improve the impact resistance of crystalline polypropylene, there have been proposed, for example, a polypropylene composition which is a blend of a crystalline ethylene-propylene block copolymer as a crystalline polypropylene with an amorphous ethylene-propylene copolymer, and a polypropylene composition which is a blend of crystalline ethylene-propylene block copolymer, an amorphous ethylene-propylene copolymer and various polyethylenes.

In these polypropylene compositions, however, the rigidity, resistance to heat deformation, etc. inherently possessed by crystalline ethylene-propylene block copolymers are reduced.

In order to improve these drawbacks of the above polypropylene compositions, various attempts have been made. For example, Japanese Patent Application Kokai (Laid-Open) No. 64257/1978 discloses a resin composition with improved low temperature impact resistance, comprising a crystalline ethylene-propylene block copolymer, an amorphous ethylene-α-olefin copolymer and talc. The document describes that the resin composition, as compared with conventional crystalline ethylene-propylene block copolymers, is substantially improved in low temperature impact resistance, rigidity and coatability, and provides Examples for supporting the description. The above composition, however, is insufficient in rigidity-impact resistance balance, mar resistance and molded article appearance.

There have also been disclosed various polypropylene compositions comprising, as a filler other than talc, a granular filler (e.g. calcium carbonate) or a fibrous filler (e.g. glass fiber). However, in the polypropylene compositions comprising a granular filler, the molded articles have no sufficient rigidity; and in the polypropylene compositions comprising a fibrous filler, although the rigidity is improved significantly, the impact resistance is low and the molded articles have poor surface appearance and give rise to warpage, deformation, etc. For example, Japanese Patent Application Kokai (Laid-Open) No. 91545/1987 proposes a polyolefin resin composition comprising a polyolefin, a thermoplastic elastomer, a fibrous reinforcing agent, talc and calcium carbonate. This composition, however, tends to yield poor appearance (e.g. silver) during injection molding and has a small improvement in rigidity because it contains calcium carbonate. Japanese Patent Application Kokai (Laid-Open) No. 69848/1986 proposes a polypropylene resin composition comprising a polypropylene resin, a fibrous filler, talc and an elastomer. This composition, however, causes deformation when molded into large-sized parts for automobiles because it contains a large amount of a fibrous filler. Meanwhile, this composition gives a small improvement in rigidity when the content of fibrous filler is low.

Thus, the molded articles made from the hitherto known resin compositions cannot be used in, for example, large-sized parts for automobiles, particularly instrument panels in which not only mechanical properties but also appearance are important, even though they can be used in certain applications in which appearance is negligible.

SUMMARY OF THE INVENTION

Under the above situation, the present inventors made an extensive study in order to obtain a polypropylene resin composition which is well balanced in rigidity and impact resistance, has good mar resistance and provides a molded article of good appearance. As a result, the present inventors have succeeded in developing a composition obtained by mixing a particular crystalline ethylene-propylene block copolymer, an amorphous ethylene-propylene copolymer, a particular talc and a particular fibrous magnesium oxysulfate and then, at the time of melt-kneading the mixture, adding a particular metal soap to the mixture, which composition retaining the fiber length of the fibrous magnesium oxysulfate and having high rigidity with the addition of a small amount of the metal soap and the fibrous magnesium oxysulfate.

According to the present invention, there is provided a polypropylene resin composition comprising (A) 67–79% by weight of a crystalline ethylene-propylene block copolymer whose ethylene content is 4–10% by weight, whose polypropylene component contains a boiling n-heptane insoluble of at least 95% by weight, whose p-xylene soluble at normal temperature has an intrinsic viscosity of at least 2 as measured in decalin at 135° C., and whose melt flow index is 3–30 g/10 min;

(B) 5–10% by weight of an amorphous ethylene-propylene copolymer having a Mooney viscosity $ML_{1+4}$ (100° C.) of 20–100;

(C) 15–20% by weight of talc having an average particle diameter of 0.5–2.5 μm; and (D) 1–3% by weight of fibrous magnesium oxysulfate having a fiber diameter of 0.1–1.5 μm and an aspect ratio of 70–150, and further comprising 0.2–0.5 part by weight, based on 100 parts by weight of the total of the components (A), (B), (C) and (D), of a metal soap.

DETAILED DESCRIPTION OF THE INVENTION

Component (A)

The component (A) of the polypropylene resin composition of the present invention is a crystalline ethylene-propylene block copolymer whose ethylene content is 4–10% by weight, preferably 5–8% by weight, whose polypropylene component contains a boiling n-heptane insoluble of at least 95% by weight, preferably at least 97% by weight, whose p-xylene soluble at normal temperature (the soluble consists of an amorphous ethylene-propylene copolymer and a low-molecular polymer) has an intrinsic viscosity of at least 2, preferably at least 3.5 as measured in decalin at 135° C., and whose melt flow index is 3–30 g/10 min, preferably 3–10 g/10 min. The above polypropylene component refers to the crystalline polypropylene (also referred to as the matrix, in some cases) used in the block copolymerization reaction to obtain the component (A). When the polypropylene component of the crystalline ethylene-propylene block copolymer contains a boiling n-heptane insoluble in an amount of less than 95% by weight, the resulting polypropylene resin composition gives a molded article of small flexural modulus. When the p-xylene soluble at normal temperature, of the crystalline ethylene-propylene block copolymer has an intrinsic viscosity of less than 2 as measured in decalin at 135° C., the resulting polypropylene resin composition gives a molded article of small Izod impact strength at −30° C.

When the melt flow index of the crystalline ethylene-propylene block copolymer is less than 3, the resulting polypropylene resin composition has poor moldability and gives a molded article of poor appearance. When the melt flow index is more than 30, the polypropylene resin composition has low impact resistance. In such cases, the polypropylene resin composition cannot be used as a material for molded articles in which rigidity, resistance to heat deformation, low temperature impact resistance and good appearance are all required.

The crystalline ethylene-propylene block copolymer is contained in the composition of the present invention excluding the metal soap in an amount of 67–79% by weight, preferably 68–75% by weight. When the content of this component deviates from the above range, the resulting polypropylene resin composition gives a molded article having a poor balance in flexural modulus and Izod impact strength at −30° C. The crystalline ethylene-propylene block copolymer may be used in combination of two or more as long as the total content is in the above range. As long as the object of the present invention is attained, there may also be used a modified crystalline ethylene-propylene block copolymer obtained by grafting a crystalline ethylene-propylene block copolymer with an unsaturated organic acid or its derivative.

Component (B)

The amorphous ethylene-propylene copolymer which is the component (B) of the present polypropylene resin composition has a Mooney viscosity $ML_{1+4}$ (100° C.) of 20–100, preferably 50–80. When the Mooney viscosity is less than 20, the resulting polypropylene resin composition gives a molded article of low rigidity, low impact resistance at low temperatures and poor appearance. When the Mooney viscosity is more than 100, it is difficult to obtain a composition of uniform dispersion by kneading and the resulting composition has low impact resistance. The amorphous ethylene-propylene copolymer (B) may be a diene-containing terpolymer as long as the object of the present invention is attained.

The amorphous ethylene-propylene copolymer (B) is contained in the polypropylene resin composition excluding the metal soap in an amount of 5–10% by weight, preferably 6–9% by weight. When the content is more than 10% by weight, the resulting composition has insufficient rigidity and low mar resistance. When the content is less than 5% by weight, the composition has low impact resistance.

Component (C)

The talc (C) used in the composition of the present invention is required to have an average particle diameter of 0.5–2.5 μm preferably 1.5–2.2 μm. When the average particle diameter is less than 0.5 μm the dispersibility of talc in the composition is poor. When the average particle diameter is more than 2.5 μm the resulting composition gives a molded article of low impact resistance. The talc is contained in the composition excluding the metal soap in an amount of 15–20% by weight, preferably 16–19% by weight. When the amount is less than 15% by weight, the resulting composition gives a molded article of insufficient rigidity. When the amount is more than 20% by weight, the composition gives a molded article of poor appearance.

Component (D)

The fibrous magnesium oxysulfate which is the component (D) of the present composition is required to have a fiber diameter of 0.1–1.5 μm preferably 0.1–0.7 μm and an aspect ratio of 70–150, preferably 90–130. When the fiber diameter is less than 0.1 μm the resulting composition gives a molded article of insufficient rigidity. When the fiber diameter is more than 1.5 μm the molded article produced from the resulting composition causes deformation. When the aspect ratio is less than 70, the resulting molded article has insufficient rigidity. When the ratio is more than 150, the molded article causes deformation.

The fibrous magnesium oxysulfate is contained in the composition of the present invention excluding the metal soap in an amount of 1–3% by weight, preferably 1.5–2.5% by weight.

When the amount is less than 1% by weight, the resulting molded article has insufficient rigidity. When the amount is more than 3% by weight, the molded article causes deformation.

Compounding, etc.

It is necessary in the present invention to add, at the time of melt-kneading the components (A), (B), (C) and (D), 0.2–0.5 part by weight, preferably 0.2–0.4 part by weight, based on 100 parts by weight of the total of the components (A), (B), (C) and (D), of a metal soap to these components. When the amount of the metal soap added deviates from the above range, the molded article of the resulting composition has low rigidity.

The metal soap can be various metal salts of higher fatty acids represented by $M(OOCR)_n$ wherein M is calcium, barium, magnesium, zinc or the like and RCOO is a residue of stearic acid, lauric acid, octylic acid or the like. Specific examples of the metal soap are magnesium stearate, calcium stearate and zinc laurate.

In order to obtain the polypropylene resin composition of the present invention, it is preferable to knead the components (A), (B), (C) and (D) and the metal soap using an extruder such as high speed double-shaft extruder, multi-vented double-shaft extruder, single-shaft extruder or the like. When a high speed double-shaft extruder is used, only the component (D) is added at an inlet of the single-shaft extruder portion; when a multi-vented double-shaft extruder is used, only the component (D) is side-feeded; thus, an appropriate kneading method must be employed in order not to reduce the aspect ratio of the fiber.

In order for the molded article produced from the polypropylene resin composition of the present invention to have higher capability, it is possible to add, during or after the compounding of the individual components, an antioxidant, an ultraviolet absorber, a flame retardant, an antistatic agent, a pigment, etc.

As described above, the polypropylene resin composition of the present invention can be obtained by compounding a particular crystalline ethylene-propylene block copolymer, an amorphous ethylene-propylene copolymer, a particular talc and a particular fibrous magnesium oxysulfate and, at the time of melt-kneading them, adding a particular metal soap, and the molded article produced from this composition has a good balance in rigidity and impact resistance and good mar resistance and can suitably be used in large-sized parts for automobiles, particularly instrument parts for automobiles.

Next, the present invention is described in more detail by way of Examples and Comparative Examples.

EXAMPLES 1-4 AND COMPARATIVE EXAMPLES 1-4

The components shown in Table 1 (appears hereinafter) was mixed with 0.2 parts by weight of a phenol type antioxidant. The mixture was subjected to kneading and pelletization at 230° C. using a high speed double-shaft extruder. In this case, only the fibrous filler was added at an inlet of the single-shaft portion of the extruder via a metering feeder. After the kneading and pelletization, the resulting pellets were molded into test pieces by an injection molder, and the best pieces were evaluated for properties according to the following test methods. The results are shown in Table 1.

(1) Izod impact strength

Measured according to ASTM D 256.

(2) Flexural modulus

Measured according to ASTM D 2584.

(3) Mar resistance

A resin composition was injection-molded into a sheet [100 mm×100 mm×3 mm (thickness)] with a leather grain pattern. The sheet was placed on a horizontal plate; a 100-yen coin was vertically placed on the sheet (the side of the coin was contacted with the sheet); the coin was moved on the sheet back and forth at a speed of 50 mm/sec with a force of 3 kg applied to the coin to rub the sheet; the degree of whitening of the rubbed part of the sheet was examined according to the following evaluation criterion.

◯: The whitening of the rubbed part of the sheet is not seen

Δ: The whitening of the rubbed part of the sheet is seen but not striking.

X : The whitening of the rubbed part of the sheet is striking.

(4) Appearance

A resin composition was injection-molded into a mirror surface sheet of 360 mm×140 mm×2 mm (thickness), and a distance from the gate to the point of the first appearance of flow mark was measured.

(5) Deformation

A resin composition was injection-molded into a mirror surface disc of 100 mm (diameter)×1.6 mm (thickness). In 48 hours after the molding, the disc was placed on a horizontal plate; a desired point of the circumference was pressed down; and the height from the horizontal plate, of the point which gave the biggest rise due to the pressing was measured.

The components used in compounding each composition were as follows.

(A-1) A crystalline ethylene-propylene block copolymer whose ethylene content is 7.0% by weight, whose polypropylene component contains a boiling n-heptane insoluble of 97.7% by weight, whose p-xylene soluble at normal temperature has an intrinsic viscosity of 4.6, and whose melt flow index is 3 g/10 min.

(A-2) A crystalline ethylene-propylene block copolymer whose ethylene content is 6.8% by weight, whose polypropylene component contains a boiling n-heptane insoluble of 97.1% by weight, whose p-xylene soluble at normal temperature has an intrinsic viscosity of 4.4, and whose melt flow index is 9 g/10 min.

(B) An amorphous ethylene-propylene copolymer having a Mooney viscosity $ML_{1+4}$ (100° C.) of 64.

(C) A talc having an average particle diameter of 1.9 μm (D) A fibrous magnesium sulfate having average fiber diameter of 0.3μ and an aspect ratio of 100.

In addition to these components, magnesium stearate was used as a metal soap.

As is clear from Table 1, all of the compositions of Examples 1-4 according to the present invention were of good quality and had a good balance of rigidity and impact resistance, good mar resistance and good appearance. In contrast, the compositions of Comparative Examples 1-4 were defective in at least any of mechanical properties, mar resistance and appearance.

TABLE 1

|  | Examples | | | | Comparative Examples | | | |
| --- | --- | --- | --- | --- | --- | --- | --- | --- |
|  | 1 | 2 | 3 | 4 | 1 | 2 | 3 | 4 |
| A-1 (wt %) | 38 | 40 | 28 | 26 | 38 | 38 | 27 | 26 |
| A-2 (wt %) | 32 | 35 | 45 | 45 | 32 | 32 | 45 | 42 |
| B (wt %) | 10 | 7 | 8 | 9.5 | 10 | 10 | 5 | 7 |
| C (wt %) | 18 | 15 | 16.5 | 17 | 18 | 15 | 23 | 23 |
| D (wt %) | 2 | 2 | 2.5 | 2.5 | 2 | 5 | 0 | 2 |
| Magnesium stearate (PHR) | 0.3 | 0.3 | 0.4 | 0.4 | 0 | 0.3 | 0.3 | 0.3 |
| Izod (23° C.) (kg · cm/cm) | 45 | 31 | 34 | 37 | 21 | 35 | 19 | 24 |
| Flexural modulus (kg/cm$^2$) | 27,300 | 28,000 | 28,700 | 27,500 | 26,200 | 31,600 | 26,000 | 30,400 |
| Mar resistance | ◯ | ◯ | ◯ | ◯ | ◯ | ◯ | x | Δ |
| Appearance (flow mark) (cm) | 16.0 | 16.8 | 17.0 | 16.5 | 16.0 | 16.5 | 14.5 | 14.3 |
| Deformation of molded | 0 | 0 | 0 | 0 | 0 | 2 | 0 | 0 |

TABLE 1-continued

|  | Examples | | | | Comparative Examples | | | |
| --- | --- | --- | --- | --- | --- | --- | --- | --- |
|  | 1 | 2 | 3 | 4 | 1 | 2 | 3 | 4 |
| article (mm) | | | | | | | | |

PHR: Parts by weight based on 100 parts by weight of the total of (A-1), (A-2), B, C and D.

What is claimed is:

1. A polypropylene resin composition, comprising:
   (A) 67-79% by weight of a crystalline ethylene-propylene block copolymer having an ethylene content of 4-10% by weight, a polypropylene component which contains a boiling n-heptane insoluble fraction of at least 95% by weight, a fraction soluble in p-xylene at normal temperature which has an intrinsic viscosity of at least 2 as measured inn decalin at 135° C., and a melt flow index of 3-30 g/10 min;
   (B) 5-10% by weight of an amorphous ethylene-propylene copolymer having a Mooney viscosity $ML_{1+4}$ (100°) of 20-100;
   (C) 15-20% by weight of talc having an average particle diameter of 0.5-2.5 μm;
   (D) 1-2.5% by weight of fibrous magnesium oxysulfate having a fiber diameter of 0.1-1.5 μm and an aspect ratio of 70-150; and
   0.2-0.5 parts by weight, based on 100 parts by weight of the total of the components (A), (B), (C) and (D), of a metal soap.

2. The polypropylene resin composition of claim 1, wherein the amorphous ethylene-propylene copolymer s a diene-containing terpolymer.

3. The polypropylene resin composition of claim 1, wherein the metal soap is selected from the group consisting of magnesium stearate, calcium stearate and zinc laurate.

* * * * *